United States Patent
Cohard et al.

(10) Patent No.: US 10,579,482 B2
(45) Date of Patent: Mar. 3, 2020

(54) METHOD OF CHECKPOINTING THE WORKING ENVIRONMENT OF A SESSION OF A USER ON A SERVER

(71) Applicant: BULL SAS, Les Clayes Sous Bois (FR)

(72) Inventors: Sylvain Cohard, Grenoble (FR); Rafael Escovar, Grenoble (FR)

(73) Assignee: BULL SAS, Les Clayes Sous Bois (FR)

( * ) Notice: Subject to any disclaimer, the term of this patent is extended or adjusted under 35 U.S.C. 154(b) by 0 days.

(21) Appl. No.: 15/213,609

(22) Filed: Jul. 19, 2016

(65) Prior Publication Data
US 2017/0024289 A1  Jan. 26, 2017

(30) Foreign Application Priority Data
Jul. 20, 2015 (FR) ...................................... 15 56852

(51) Int. Cl.
G06F 11/00 (2006.01)
G06F 11/14 (2006.01)

(52) U.S. Cl.
CPC .... *G06F 11/1471* (2013.01); *G06F 2201/805* (2013.01); *G06F 2201/84* (2013.01)

(58) Field of Classification Search
CPC ............ G06F 11/1407; G06F 11/1471; G06F 2201/805; G06F 2201/84; H04L 69/40
See application file for complete search history.

(56) References Cited

U.S. PATENT DOCUMENTS

| | | | | |
|---|---|---|---|---|
| 5,495,590 A | * | 2/1996 | Comfort | G06F 9/3863 712/228 |
| 6,052,712 A | * | 4/2000 | Badovinatz | G06F 8/458 709/201 |
| 6,161,196 A | * | 12/2000 | Tsai | G06F 11/1658 714/10 |
| 7,082,551 B2 | | 7/2006 | Lawrance et al. | |
| 8,195,722 B1 | * | 6/2012 | Havemose | G06F 17/30144 707/821 |
| 8,464,256 B1 | * | 6/2013 | Havemose | G06F 9/4856 718/1 |
| 8,539,488 B1 | * | 9/2013 | Havemose | G06F 11/1469 718/100 |
| 8,745,442 B1 | * | 6/2014 | Havemose | G06F 11/1438 714/13 |
| 8,826,070 B1 | | 9/2014 | Havemose et al. | |

(Continued)

OTHER PUBLICATIONS

Preliminary Exam Report from Institut National de la Propriéte Industrielle, dated May 23, 2016 (6 pgs).

*Primary Examiner* — Joshua P Lottich
(74) *Attorney, Agent, or Firm* — Patterson Thuente Pedersen, P.A.

(57) ABSTRACT

The invention relates to a method of checkpointing the working environment of a user (7) session on a server (1) comprising a first step (11) of checkpointing the working environment of a first application of said session, characterized in that it comprises at least one second step (12) of checkpointing the working environment of a second application of said session different from said first application, and in that said first checkpointing step (11) and said second checkpointing step (12) are synchronized with each other such that the checkpointed working environment of the first application and the checkpointed working environment of the second application are coherent with each other.

22 Claims, 2 Drawing Sheets

(56) References Cited

U.S. PATENT DOCUMENTS

| | | | |
|---|---|---|---|
| 9,043,640 B1* | 5/2015 | Havemose | G06F 11/203 707/610 |
| 9,286,109 B1* | 3/2016 | Backensto | G06F 9/461 |
| 9,354,977 B1* | 5/2016 | Backensto | G06F 11/1448 |
| 9,727,420 B2* | 8/2017 | Waldspurger | G06F 11/1407 |
| 9,870,290 B1* | 1/2018 | Havemose | G06F 11/1451 |
| 2002/0147890 A1* | 10/2002 | Saulsbury | G06F 11/1471 711/154 |
| 2003/0140272 A1 | 7/2003 | Lawrance et al. | |
| 2004/0153757 A1 | 8/2004 | Blakeney | |
| 2005/0034014 A1* | 2/2005 | Moser | G06F 9/485 714/17 |
| 2005/0289246 A1* | 12/2005 | Easton | G06F 12/109 710/1 |
| 2006/0101033 A1* | 5/2006 | Hu | G06F 11/1471 |
| 2006/0271813 A1* | 11/2006 | Horton | G06F 11/2028 714/4.11 |
| 2007/0244962 A1* | 10/2007 | Laadan | G06F 11/1438 709/201 |
| 2008/0016249 A1* | 1/2008 | Ellis | G06F 9/52 709/248 |
| 2008/0077921 A1* | 3/2008 | Chaudhary | G06F 9/52 718/100 |
| 2008/0114842 A1* | 5/2008 | Ellis | H04L 51/18 709/206 |
| 2009/0307375 A1* | 12/2009 | McCarthy | G06Q 10/109 709/248 |
| 2010/0281239 A1* | 11/2010 | Sudhakar | G06F 9/3824 712/222 |
| 2012/0072844 A1* | 3/2012 | Lefrancois des Courtis | G06Q 30/02 715/736 |
| 2013/0275808 A1* | 10/2013 | McNeeney | G06F 11/1482 714/20 |
| 2015/0212909 A1* | 7/2015 | Sporel | G06F 11/2023 714/4.11 |
| 2015/0278039 A1* | 10/2015 | Bogdanov | G06F 11/2023 714/4.11 |

\* cited by examiner

METHOD OF CHECKPOINTING THE WORKING ENVIRONMENT OF A SESSION OF A USER ON A SERVER

RELATED APPLICATIONS

This application claims the benefit of French National Patent Application No. 1556852, filed on Jul. 20, 2015, said application being hereby fully incorporated herein by reference.

FIELD OF THE INVENTION

The invention relates to the field of methods of checkpointing the working environment of a session of a user on a server, as well as the field of server networks using such checkpointing methods.

BACKGROUND OF THE INVENTION

According to the prior art, a method of checkpointing the working environment of an application operating during a session of a user on a server is known. Checkpointing is performed at the level of this application by a checkpointing method integrated with this application. Then, the application can be restarted from this checkpoint following an incident when it then disappeared. This is a checkpoint/restart sequence.

Ideally, to restore an entire user session on a server, each of the applications launched during the session should have such a checkpointing method. In this case, each checkpointing method checkpointed a state of the corresponding application, completely independently from other session applications. Each application is restarted separately on the basis of the state of the working environment that was checkpointed at its level.

The need to implement several checkpointing methods respectively in different applications to restart the different applications separately makes this prior art complex. In addition, as checkpoints have been made for each application independently from the other applications, a risk of incoherence between checkpointed states exists.

This incoherence may require the user to go back to one and/or the other of the applications to an earlier checkpointed state, and so on until only the checkpointed states presenting a certain coherence between each other are the initial application states; this is the domino effect that must be avoided.

SUMMARY OF THE INVENTION

The aim of the present invention is to provide a checkpointing method at least partially mitigating the aforementioned disadvantages.

More specifically, the invention aims to provide a checkpointing method that can checkpoint at least two applications launched during a session and can restart the two applications whose states were checkpointed without risking a domino effect.

To restart a session in which at least two applications have been launched, each application should first have its checkpointing method, and then should be able to make the checkpointed states compatible with each other. As each checkpointing method changes independently from the others at the application level, this harmonization risks being difficult and tedious.

The invention proposes using a checkpointing method that is common to both applications, performing synchronized checkpoints of the two applications, such that their respective checkpointed working environments are coherent with each other. Therefore, simultaneously starting the two session applications, or even preferentially all of the session applications, i.e., the entire session, is made easier and faster, thanks to the different checkpointed environments that are coherent with each other, corresponding to the different respective applications launched during the session.

For this purpose, the present invention proposes a method of checkpointing the working environment of a user session on a server comprising a first step of checkpointing the working environment of a first application of said session, characterized in that it comprises at least one second step of checkpointing the working environment of a second application of said session different from said first application, and in that said first checkpointing step and said second checkpointing step are synchronized with each other such that the checkpointed working environment of the first application and the checkpointed working environment of the second application are coherent with each other.

For this purpose, the present invention also proposes a network of servers characterized in that it stores and it is configured to carry out regularly, and preferably periodically, the checkpointing method according to the invention, at the level of several servers in said network, and preferably at the level of all of the servers in said network.

The invention is inexpensive in terms of implementation. It is also inexpensive in machine resources such as, for example, disk space, memory requirements or processing requirements.

According to preferred embodiments, the invention comprises one or more of the following characteristics that may be used separately or in partial or total combination between each other, with one or the other of the aforementioned objects of the invention.

Preferably, the working environment of said first application and the working environment of said second application share common data between them, the state of the data is variable over time, and the state of said common checkpointed data is identical for the two checkpoint steps. Therefore, the identical character of the common checkpointed data ensures total coherence between the checkpointed states of the two applications.

Preferably, all of the checkpoint steps of all of the applications of said session are synchronized with each other as said first and second checkpoint steps. Therefore, the entire session can be easily checkpointed and retrieved by the checkpointing method according to the invention, because all of the applications launched in this session will have been, first, checkpointed and, second, checkpointed coherently between each other.

All of the sessions on said server are preferably checkpointed in the same manner. Therefore, all of the sessions can be easily checkpointed and retrieved by the checkpointing method according to the invention, because all of the sessions in progress will have been, first, checkpointed and, second, checkpointed coherently between each other.

Preferably, all of the sessions of all of the servers in the same network are checkpointed in the same manner. Therefore, all of the sessions on the same network can be easily checkpointed and retrieved by the checkpointing method according to the invention, because all of the sessions in progress on the entire network will have been, first, checkpointed and, second, checkpointed coherently between each other.

Preferably, the checkpointing method according to the invention comprises, following said checkpointing steps, a step of restarting said session or sessions with its or their checkpointed working environment. Therefore, up to the checkpointing time, all of the work performed will have been retained, and the user will not have to start again from the beginning.

Preferably, said checkpointing steps are carried out regularly, and preferably periodically, and said restarting step is performed once an incident at the level of said server has ended, the incident preferably being a power outage of said server or a hardware or software failure of said server or a maintenance of said server. Therefore, the effect of the incident, which may be disastrous normally, is here limited to the loss of the short period of work performed between the last checkpoint and the incident.

Preferably, said checkpoint steps are carried out on the initiative of the user, and said restart step is carried out on the initiative of the user. Therefore, the user can checkpoint the status of the entire session at will when this status is most convenient for him before modifying, possibly more uncertainly, this status, knowing that he can, in the event of failure, easily return to this interesting checkpointed status from which he can start again.

Preferably, said checkpointing steps are carried out on said server, and said restart step is carried out on another server, different from said server when said server remains unavailable following an incident, for a time period exceeding a predetermined duration, said checkpointed working environment being sent to the other server, prior to said restart step. Therefore, even in the event of prolonged unavailability of the server on which the user is working, this user can immediately take advantage of the checkpoint performed by restarting the checkpointed session on another server which is, first, available and which has, second, the information necessary to enable the restart of this checkpointed session.

Preferably, said working environments to be checkpointed are checkpointed in a storage structure common to several servers in the same network, and preferably common to all servers in the same network. Therefore, the level of communication on the network and, consequently, the level of noise on the network are significantly reduced compared to a system where the servers would store their working environment in their own memory to then send it to all the other servers needing it. On the contrary, all of the working environments are stored in the same location that the other servers can directly consult, but which they will only consult if needed. In this manner, only the server that will replace another unavailable server, and not all the servers in the network, will consult this location to obtain the checkpointed working environment.

Preferably, said storage structure common to several servers in the same network is distributed on these same servers and uses part of the storage disk of several of these servers or all of these servers. Data are distributed between the servers, and each bit of data is duplicated, i.e., ultimately stored on at least two servers, but of course not on all the servers. Therefore, the functionally unique storage location reduces the communication and noise on the network, while the structurally distributed character of this functionally unique storage location enables available and unemployed resources, and thus inexpensive resources, on the various servers to be used, whereas to create a large centralized memory to store all of these checkpointed environments would cost an extra, relatively large resource. The distribution of storage, which involves the distribution of data with duplication at certain locations but not everywhere, simultaneously enables space to be saved and a degree of redundancy to be provided so as to not lose data in the event of localized corruption of this data.

Preferably, each of the servers in the same network reports regularly, and preferably periodically, to several other servers of said network, and preferably to all other servers of said network, whether it is operational or not. Therefore, the unavailable character of a server in the network is immediately recognized. Admittedly, this causes a little data to circulate on the network, but only a very small amount, and immeasurably less than the volume of data that would be necessary for the regular communication of checkpointed environments. In addition, this avoids having to store this very sensitive data, i.e., the available or unavailable character of all of the servers, in a single location which would then become the weak link in the system because, in the event of failure at this level, the entire network would become paralyzed at the checkpoint level. Sending this availability information from one server to other servers ("heartbeating") in the network ensures the proper, robust operation of the checkpoints.

Preferably, when a server in a network becomes unavailable, a user having opened a session on this server reports this unavailability to a common address or to a resource scheduler, so as to be able to restart, on another server in this network, his checkpointed session which was open on the server that has now become unavailable. This specific element of the network will organize the succession and assign a suitable replacement server to this user, i.e., an available server that can be used by this user while only causing minimal disruption to the level of operation of the entire network.

Preferably, the functionalities of said method are stored in the user space of said server but are managed by the core of said server. Therefore, this checkpointing method is to a large extent made independent from the operating system effectively used by the core server.

Preferably, when checkpointing said working environment, at least the following are checkpointed: The session's environmental variables, the history of commands during the session, the functions used by the user but not defined during connection of the user at the start of the session and the applications running during the session. Therefore, the main elements of a session in progress will be checkpointed and this session can restart with an efficacy similar to that which it had without incident, in a number of cases greater than 95% of potential cases.

Preferably, the server network does not comprise a system of maintaining electrical power in the event of an incident, and preferably it does not comprise a converter. Therefore, in the event of an incident, there is no system that can prolong the availability of the server, possibly to the end of the incident, which incident would then be transparent to the server. On the contrary, in the event of an incident, the server immediately fails, which makes the presence of the checkpointing method according to the invention for mitigating the effects of this server failure even more interesting. The larger the server network, the more complex and expensive it becomes to associate this type of electrical power maintenance system, which is for example a converter, with it.

Preferably, the server network comprises at least 2 servers, preferably at least 10 servers, still more preferably at least 100 servers, and still more preferably at least 1000 servers. The higher the number of servers, the more incidents likely to disrupt sessions in progress, and the more interesting the presence of the checkpointing method according to the invention becomes for mitigating the ever more numerous effects of this increasing number of incidents.

Other characteristics and advantages of the invention will appear upon reading the following description of a preferred embodiment of the invention, given by way of example with reference to the appended drawings.

DETAILED DESCRIPTION OF THE INVENTION

Figure 1:
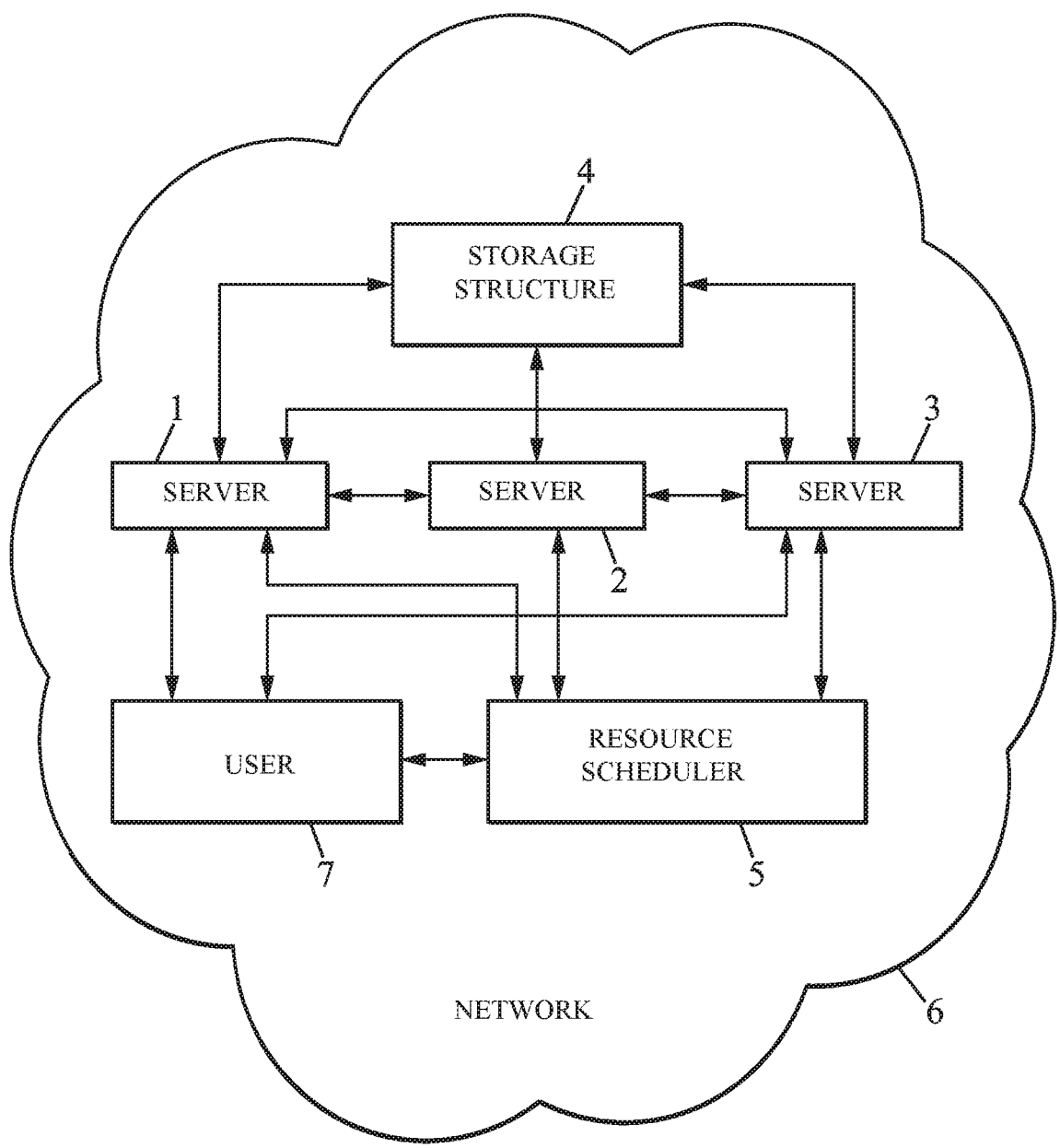
FIG. 1 schematically represents an example of a server network implementing the checkpointing method according to an embodiment of the invention.

FIG. 1 schematically represents an example of a server network implementing the checkpointing method according to an embodiment of the invention. The arrows indicate communications between elements of the network with the direction of communication.

A network 6 comprises many servers. Here, for reasons of clarity, only servers 1, 2 and 3 are represented. Network 6 also comprises a storage structure 4 and a resource scheduler 5.

A user 7 opened a session on server 1. User 7 is a client computer station of server 1. Servers 1, 2 and 3 communicate with each other to say that they are operational, i.e. available. Servers 1, 2 and 3 periodically perform checkpoints of all their sessions on storage structure 4. Daemons, i.e., software programs running in the background, managing the checkpoint and restart system synchronize with each other to ensure they have user session data, if needed.

An incident occurs at the level of server 1 and the user 7 session suddenly crashes and is lost. A copy of this crashed session exists in storage structure 4; this copy corresponds to the state of this session when the last checkpoint is performed, generally a relatively short time before the incident occurs. Server 1 is unavailable; therefore it has stopped sending its availability signal to servers 2 and 3, who thus know that server 1 has become unavailable. User 7 reports the suspension of its session to resource scheduler 5. If during the end of the incident, and even for a certain period of time after the end of the incident, server 1 still remains unavailable, then according to predefined priority criteria including, for example, the volume of tasks in progress, available memory, etc., resource scheduler 5 chooses another available server from among remaining servers 2 and 3, for example server 3.

Chosen server 3 downloads the checkpointed working environment of the user 7 session on server 1 from storage structure 4. Server 3 reopens the session of user 7, who will be connected to server 3 with his session reopened with the checkpointed working environment. This reopening of the user 7 session may have been reported previously by the resource scheduler 5. User 7 can resume his session in the state it was in during the last checkpoint, but this time on server 3.

If server 1 becomes available again at the end of the incident, or within a predetermined period of time after the end of the incident, user 7 will resume his session under the same conditions, but this time by resuming the session on the same server 1. If, instead of an incident, it's a checkpoint initiated by user 7 which took place, the session can be stopped, also at the initiative of user 7, to resume from the last checkpoint performed at the initiative of user 7, this time preferentially on the same server 1.

Figure 2:
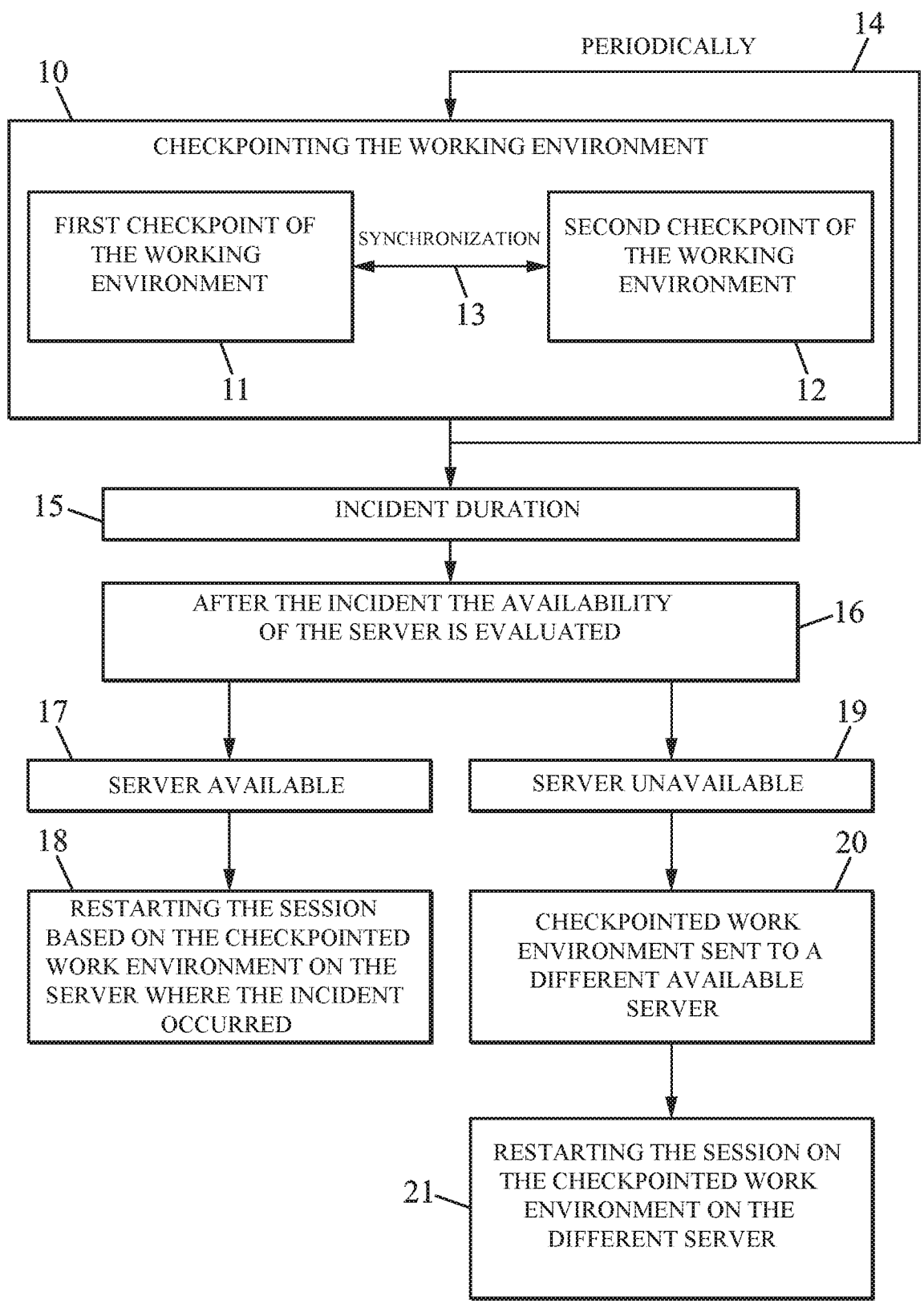
FIG. 2 schematically represents an example of the sequence of steps of the checkpointing method according to an embodiment of the invention.

FIG. 2 schematically represents an example of the sequence of steps of the checkpointing method according to an embodiment of the invention.

The method comprises a step 10 of checkpointing the working environment of a user session on a given server. In this step 10 of checkpointing the working environment of a user session on a given server, two sub-steps 11 and 12 are performed. These sub-steps include a sub-step 11 consisting of the first checkpoint of the working environment of a first application in this user session and a sub-step 12 consisting of the second checkpoint of the working environment of a second application in this user session. Synchronization 13 synchronizes between the two sub-steps 11 and 12. A loop 14 enables this step 10 of checkpointing the working environment of this user session to be performed periodically.

Data associated with the working environment of the user session on a server are tracked. These tracks are stored in a user-specific directory and are read at the start of a session, enabling the user to resume his work in progress. However, in the absence of a checkpoint, and in the event of an incident, all data risk being lost.

In particular, the checkpointed working environment comprises, for example: environment variables, command history, aliases, i.e., command shortcuts or command end routines, for example, not defined during connection of the user, and specific running processes. In addition, a specific service is activated to checkpoint session data and make the data usable on several different servers, in the event of prolonged unavailability of the original server. This session information includes metadata, such as for example, the name of the user, identifier of the server, identifier of the session and connection and disconnection times of the user. In addition, a tool can be provided allowing the user to checkpoint the environment and restore it at will on the same server or of course on another distinct server in the event of prolonged unavailability of the original server.

An incident lasts a certain amount of time during which this user session crashes and during which the original server on which this user session proceeded is unavailable. Step 15 is the duration of the incident.

At the end of the incident, a timing step 16 is launched and at the end of this timing step 16, i.e., after a predetermined period of time has elapsed after the incident has ended, the availability of the server on which the incident occurred (original server) is evaluated: Either this server is again available, or this server is still unavailable.

If this server is again available, which corresponds to step 17, then this user session is restarted on the basis of the checkpointed working environment on the server on which the incident occurred.

If this server is still unavailable, which corresponds to step 19, first the checkpointed working environment is sent to another available server, distinct from the server on which the incident occurred and which is still unavailable, during a communication step 20, and then a step 21 of restarting this user session is carried out on the basis of the checkpointed working environment, but on this other available server distinct from the server on which the incident occurred.

Here is the sequence of a simple example of use in an environment with a Linux Bash. The user is writing a program with a certain editor X. He is working on a remote Linux server from his Windows (registered trademark) work station. The remote server crashes following a power failure. The user is connected to another server that is present, the system detects that he is not on the same server, and proposes that he resume the work he began. The daemon of this new server detected that the daemon of the prior server is no longer there or has encountered a problem. Therefore, thanks to the checkpoint performed, the user was only slightly disrupted by the incident and could quickly resume his session under good conditions.

Of course, the present invention is not limited to the examples and embodiment described and represented, but is suitable for many variations accessible to the person skilled in the art.

The invention claimed is:

1. A method of checkpointing a working environment of a session of a user on a server comprising;
    checkpointing working environments of respectively a plurality of applications of said session,
    wherein all steps of checkpointing of all the plurality of applications are synchronized with one another such that checkpointing working environments of all said applications are in synchrony, and
    wherein, when said working environment is checkpointed, at least environment variables of the session, a command history during the session, and functions used by the user but not defined during connection of the user at the start of the session and the applications running during the session are checkpointed.

2. The checkpointing method according to claim 1, wherein the working environment of a first application and the working environment of a second application share a common data between them, the state of the common data is variable over time, and in that the state of a common checkpointed data is identical for two checkpoint steps.

3. The checkpointing method according to claim 1, wherein all of a plurality of sessions on said server are checkpointed.

4. The checkpointing method according to claim 3, wherein all of the sessions of all servers of the network are checkpointed.

5. The checkpointing method according to claim 1, wherein said method also comprises, after all the checkpointing steps, a step of restarting said session of the user on the server or sessions of the user on the server with a checkpointed working environment.

6. The checkpointing method according to claim 5, wherein all the checkpointing steps are carried out periodically, and said restarting step is performed once an incident at a level of said server has ended, the incident preferably being a power outage of said server or a hardware or software failure of said server or a maintenance of said server.

7. The checkpointing method according to claim 5, wherein all the checkpointing steps and said restarting step is performed at the initiative of the user.

8. The checkpointing method according to claim 1, wherein a plurality of functionalities of said method are stored in a user space of said server but are managed by a core of said server.

9. A method of checkpointing a working environment of a session of a user on a server according to claim 1,
    wherein a network does not comprise a system of maintaining electrical power in the event of an incident.

10. A method of checkpointing a working environment of a session of a user on a server comprising:
    checkpointing working environments of respectively a plurality of applications of said session,
    wherein all of the steps of checkpointing of all the plurality of applications are synchronized with one another such that checkpointing working environments of all said applications are in synchrony,
    wherein said method also comprises, after all the checkpointing steps, a step of restarting said session of the user on the server or sessions of the user on the server with its or their checkpointed working environment, and
    wherein all the checkpointing steps are carried out on said server, and in that said restarting step is carried out on another server, different from said server when said server remains unavailable following an incident, for a time period exceeding a predetermined duration, said checkpointed working environment being sent to the other server, prior to said restart step.

11. The checkpointing method according to claim 10, wherein said working environments to be checkpointed are checkpointed in a storage structure common to a plurality of servers in the network.

12. The checkpointing method according to claim 11, wherein said storage structure common to the plurality of servers in the network is distributed over the servers and uses part of a storage disk of the plurality of the servers or of all of the servers.

13. The checkpointing method according to claim 10, wherein each of a plurality of servers in the network reports to other servers of said network-whether it is operational or not.

14. A network of servers wherein a network stores and is configured to carry out the checkpointing method according to claim 10, at a level of servers of said network.

15. The server network according to claim 14, wherein the network does not comprise a converter.

16. The server network according to claim 14, wherein the network comprises at least 2 servers.

17. The server network according to claim 14, wherein the network comprises at least 10 servers.

18. The server network according to claim 14, wherein the network comprises at least 100 servers.

19. The server network according to claim 14, wherein the network comprises at least 1000 servers.

20. A method of checkpointing a working environment of a session of a user on a server according to claim 10,
    wherein a network does not comprise a system of maintaining electrical power in the event of an incident.

21. A method of checkpointing a working environment of a session of a user on a server comprising;
    checkpointing working environments of respectively a plurality of applications of said session,
    wherein all of the steps of checkpointing of all the plurality of applications are synchronized with one another such that checkpointing working environments of all said applications are in synchrony, and
    wherein when the server in a network becomes unavailable, a user having opened a session on the server reports this unavailability to a common address or to a resource scheduler, so as to be able to restart, on another server in the network, the checkpointed session which was open on the server that has now become unavailable.

22. A method of checkpointing a working environment of a session of a user on a server according to claim 21, wherein the network does not comprise a system of maintaining electrical power in the event of an incident.

\* \* \* \* \*